United States Patent
Aufenanger

(10) Patent No.: US 10,935,067 B2
(45) Date of Patent: Mar. 2, 2021

(54) REVERSE-THREAD INSERT ANCHOR FOR MASONRY APPLICATIONS

(71) Applicant: Joseph Edward Aufenanger, Tequesta, FL (US)

(72) Inventor: Joseph Edward Aufenanger, Tequesta, FL (US)

(73) Assignee: Max Gripp Anchors, LLC, Tequesta, FL (US)

( * ) Notice: Subject to any disclaimer, the term of this patent is extended or adjusted under 35 U.S.C. 154(b) by 36 days.

(21) Appl. No.: 16/298,107

(22) Filed: Mar. 11, 2019

(65) Prior Publication Data

US 2020/0063783 A1 Feb. 27, 2020

Related U.S. Application Data

(60) Provisional application No. 62/720,642, filed on Aug. 21, 2018.

(51) Int. Cl.
*F16B 37/12* (2006.01)
*F16B 33/00* (2006.01)

(52) U.S. Cl.
CPC .......... *F16B 37/127* (2013.01); *F16B 33/008* (2013.01); *F16B 37/12* (2013.01)

(58) Field of Classification Search
CPC ........ F16B 5/025; F16B 23/003; F16B 25/00; F16B 33/008; F16B 37/12; F16B 37/122; F16B 37/125; F16B 37/127; F22B 7/16
USPC ........... 411/16, 178, 381–382, 402–403, 411
See application file for complete search history.

(56) References Cited

U.S. PATENT DOCUMENTS

| | | | |
|---|---|---|---|
| 4,162,133 A | 7/1979 | Clark et al. | |
| 4,848,032 A | 7/1989 | Ballor et al. | |
| 5,085,547 A * | 2/1992 | Vanotti | E01B 9/18 411/72 |
| 6,196,780 B1 | 3/2001 | Wakai et al. | |
| 6,296,433 B1 | 10/2001 | Forsell et al. | |
| 6,350,093 B1 * | 2/2002 | Petersen | F16B 33/002 411/178 |
| 8,206,071 B1 * | 6/2012 | Johnson | H05K 7/1495 411/383 |
| 8,449,235 B2 | 5/2013 | Hettich et al. | |
| 8,764,365 B2 * | 7/2014 | Roessner | F16B 37/122 411/395 |
| 9,091,167 B2 | 7/2015 | Craig | |
| 9,695,855 B2 | 7/2017 | Lin | |
| 10,145,405 B1 * | 12/2018 | Strom | B23P 6/00 |
| 2006/0067803 A1 | 3/2006 | Hsu | |
| 2008/0240883 A1 * | 10/2008 | Walling | F16B 37/125 411/178 |
| 2009/0118772 A1 | 5/2009 | Diederich et al. | |
| 2010/0108843 A1 | 5/2010 | Shaffer | |

(Continued)

*Primary Examiner* — Roberta S Delisle
(74) *Attorney, Agent, or Firm* — Dunlap Bennett & Ludwig, PLLC

(57) ABSTRACT

A fastener anchoring system is disclosed. The fastener anchoring system provides for an anchor with first-direction external threading, while a bore through the anchor provides second-direction internal threading. Thus, the anchor is screwed/secured to a substrate in the first direction and unscrewed in the second direction, while the fastener being anchored in the bore is screwed/secured in the second direction and unscrewed in the first direction. As a result, unscrewing the fastener does not urge the unscrewing of the anchor from the substrate.

8 Claims, 5 Drawing Sheets

(56) References Cited

U.S. PATENT DOCUMENTS

| | | | |
|---|---|---|---|
| 2010/0316466 A1* | 12/2010 | Hettich | B21C 37/122 411/395 |
| 2010/0322738 A1* | 12/2010 | Lau | F16B 37/125 411/17 |
| 2010/0329814 A1* | 12/2010 | Strom | B23P 6/00 411/172 |
| 2012/0183372 A1* | 7/2012 | Roessner | F16B 25/0026 411/395 |
| 2014/0017035 A1 | 1/2014 | Michiwaki | |
| 2015/0023754 A1* | 1/2015 | Liu | F16B 37/125 411/103 |
| 2015/0152906 A1* | 6/2015 | Lai | F16B 5/0233 411/403 |
| 2015/0247519 A1 | 9/2015 | Call et al. | |
| 2016/0223006 A1 | 8/2016 | Hettich | |
| 2018/0023615 A1 | 1/2018 | Michiwaki | |
| 2018/0135679 A1 | 5/2018 | DiChiara, Jr. et al. | |

* cited by examiner

REVERSE-THREAD INSERT ANCHOR FOR MASONRY APPLICATIONS

CROSS-REFERENCE TO RELATED APPLICATION

This application claims the benefit of priority of U.S. provisional application No. 62/720,642, filed 21 Aug. 2018, the contents of which are herein incorporated by reference.

BACKGROUND OF THE INVENTION

The present invention relates to fastener anchoring systems and, more particularly, a fastener anchoring system wherein the anchor provides outer insertion threading in the opposite, reverse direction as the internal threading for receiving the anchored bolt, and a method of using the same in masonry applications.

Fastener anchors, especially in masonry applications, screw into a substrate in the same "first" direction (for example, clockwise direction) that the operatively associated fastener (e.g., bolt) screws into the anchor. And so, both the anchor and bolt are unscrewed in the same "second" direction (counter-clockwise). It is noteworthy to point out that from time to time, the bolts of such fastener anchoring systems need to be unscrewed and refastened when changes need to be made to the devices they secure. When even slight corrosion is present between the bolt and the anchor, however, the removal of the bolt can result in removal of the anchor as both are accomplished in the same direction. In other words, when a bolt and anchor screw in in the same direction (clockwise), they will also unscrew together upon bolt removal (counterclockwise) in the presence of corrosion or other types of bonding, possibly due to overpainting, damage to the anchor fastening system (cross threading), or the like.

Anchors used in Hurricane protection applications have been fraught with problems over the years. There are basically three types of anchors that are used for these applications and all utilize Industry wide ¼-20 attachment bolts. A summary of these anchors is presented below:

(1) Male "Panelmate" type anchors. These anchors use a tapcon type thread (available in various lengths depending on embedment depth requirements) that screw into the substrate. The male anchor has a ¼-20 stud of several lengths that accept a wingnut for attaching the protective device. When the protective device is not in place, a plastic cap covers and protects the threads from corrosion or physical damage. This is an inexpensive anchor, however, is not aesthetically pleasing and presents a hazard to occupants in the form of clothing and bodily damage.

(2) The Female version of this "Panelmate" type anchor has a "collar" attached to the top that accept a ¼-20 threaded bolt. Because the collar has a finite threaded depth of ½", this anchor requires one bolt (1") for deploying the protective device and a separate bolt (½") for sealing the anchor to protect it from corrosion and insect infiltration. This anchor costs almost 4× its male counterpart and has several distinct problems. This anchor requires two drilling steps for initial installation; a $7/32$" drill for the threaded portion and a $7/16$" dia. for countersinking the ¾" depth collar. In addition, it requires removing the ½" bolt and replace it with a 1" bolt in order to deploy the protective device. This results in two screwing steps and increases the likelihood of a bolt being cross threaded.

(3) The Flush Insert type anchor. These anchors have been commonly referred to as "lead anchors" but are actually a carbon steel material. This anchor has a ¼-20 internal thread for the sidewalk bolt. One of the two types of this anchor is secured in place by setting a wedge that expands the diameter of the anchor in the wall. The "setting" operation can either be accomplished by striking with a hammer or driving with a drill.

The other type has a screw type helix thread on the outside diameter that screws and bites into the inner diameter of the drilled hole. The anchor is driven by a $5/16$" hex on the inside diameter of the anchor. Both anchor types sit flush to the anchoring surface when installed.

The settable anchor is problematic in that it has a finite threaded depth. This requires careful and specific lengths of attachment bolts. Sometimes it will require two sets of bolts similar to the Female "Panelmate" type anchor.

Note that all three of these anchors screw into the substrate in the standard clockwise direction. Since the Industry standard sidewalk bolts are stainless steel, the occurrence of galvanic corrosion is ever present. The deployment of Hurricane protection devices is not regular and is as frequent as annually or as infrequent as every 5-10 years. Although anchor manufacturers recommend the use of a washer between the bolt and the anchor, they are seldom used. It is often the case, that when a bolt is removed (counterclockwise) and corrosion is present, the bolt and anchor are unscrewed as an assembly. Excessive painting over the bolt and the anchor also "locks" the bolt to the anchor over time. Once removed, the anchor cannot be reused as the concrete hole diameter is compromised. There are several "solutions" available to the homeowner;

1—Relocate the anchor to a new position. This is not a good alternative as it changes anchor spacing, contradicting specified distances on the product approval.

2—Replace the anchor with a larger diameter unit. This requires re drilling the hole and sourcing a ⅜" diameter anchor which is not readily available.

3—Reinsert the anchor using a two part epoxy intended for rebar applications. This method is not on Product Approvals and the anchors performance integrity cannot be verified.

All these "solutions" inhibit the timely deployment of Hurricane protection and compromise the protective device. The Reverse Insertion anchor will eliminate the problem associated with standard clockwise insertion anchors and will be much more tolerable to the removal of cross threaded bolts.

Furthermore, bolts are often cross threaded during installation due to the homeowner's limited installation experience and the inevitable haste of the task at hand. When the bolt is cross threaded during deployment of the protective device, the result is the removal of the bolt and the anchor as an assembly, this time attached to the protective device.

Note that the anchors that require two sets of bolts increase the probability of a cross threaded bolt.

As can be seen, there is a need for a fastener anchoring system wherein the anchor provides outer insertion threading in the opposite, reverse direction as the internal threading for receiving the anchored bolt, and a method of using the same in masonry applications. By the anchor having an insertion (into the substrate) threading oriented in a direction reverse that of fastener insertion (into the anchor), there is no chance of the anchor coming out with the fastener in the presence of corrosion or even if there is cross threading between the fastener and the anchor.

Therefore, the fastening system embodied in the present invention, especially for masonry applications involving anchoring hurricane protective devices, enables removal of the bolt using high torque levels without fear of removing the anchor.

SUMMARY OF THE INVENTION

In one aspect of the present invention, a fastener anchoring system includes the following: an anchor body extending from a head end to a bottom end; the anchor having external first-direction threading along an outer surface of the anchor body; a bore extending through the anchor body; and the bore having second-direction threading along an inner surface of the anchor body.

In another aspect of the present invention, the fastener anchoring system, includes the following: an anchor body extending from a head end to a bottom end; the anchor having external left-handed threading along an outer surface of the anchor body; a bore extending through the anchor body; and the bore having fight-handed threading along an inner surface an inner surface of the anchor body; a head extending from the head end; and the head providing a female receptacle for operatively associating with a driver of the anchor body, wherein the female receptacle at least circumscribes or is greater than an opening of the bore; and a fastener having right-handed threading along an outer surface of a body of the fastener.

In yet another aspect of the present invention, a method of installing anchor fasteners for hurricane-protective devices includes the following: providing the above-mentioned fastener anchoring system; screwing the anchor body into a substrate in a counter-clockwise direction; and screwing the fastener into the bore in a clockwise direction, wherein the fastener secures a portion of a hurricane-protective device.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
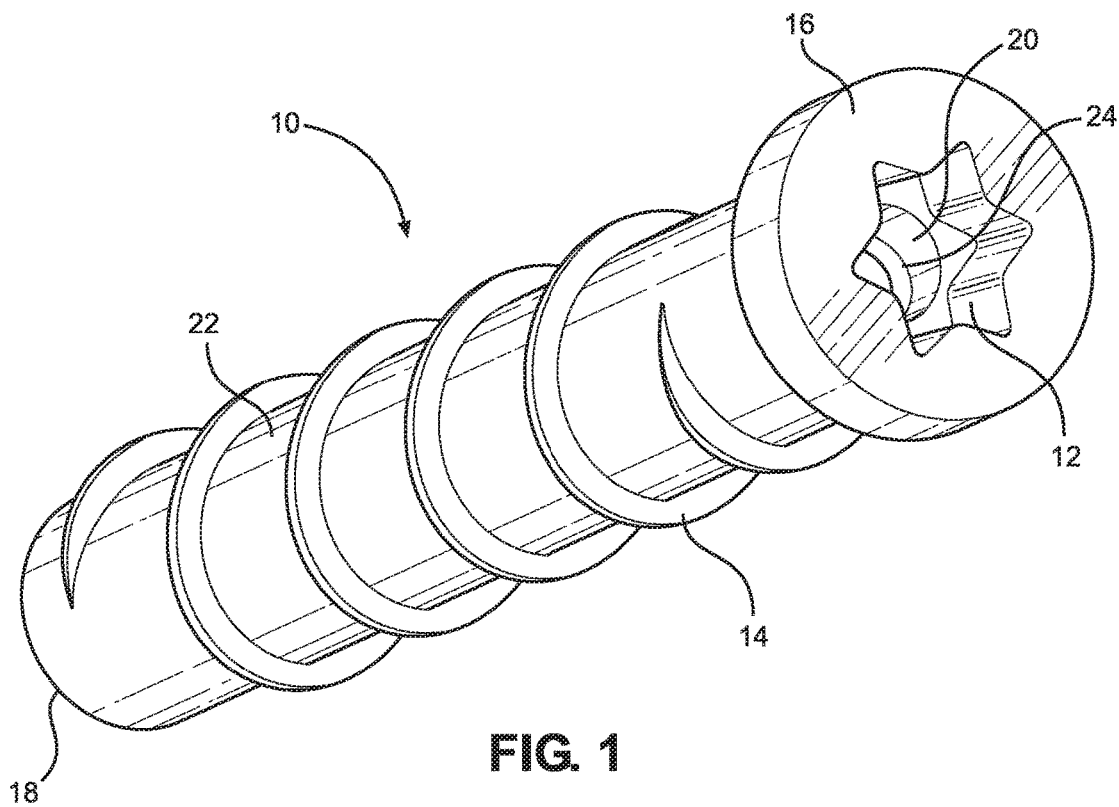
FIG. 1 is a top perspective view of an exemplary embodiment of the present invention.
Figure 2:
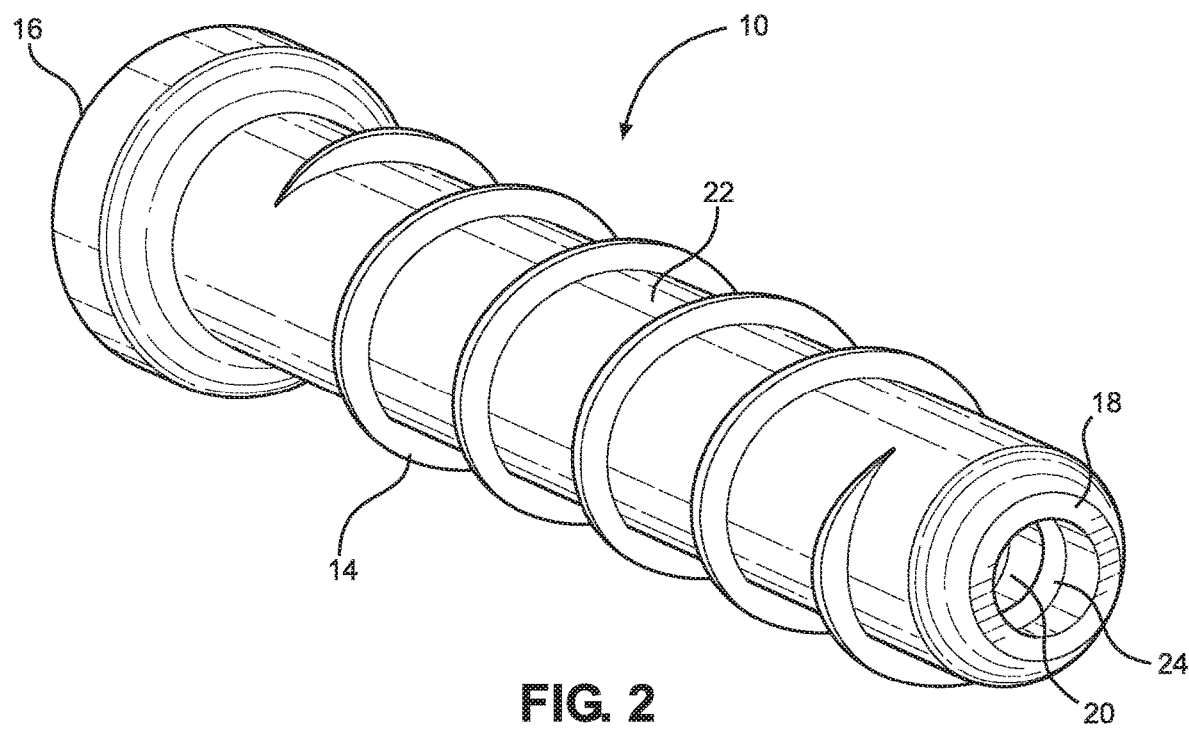
FIG. 2 is a bottom perspective view of an exemplary embodiment of the present invention.
Figure 3:
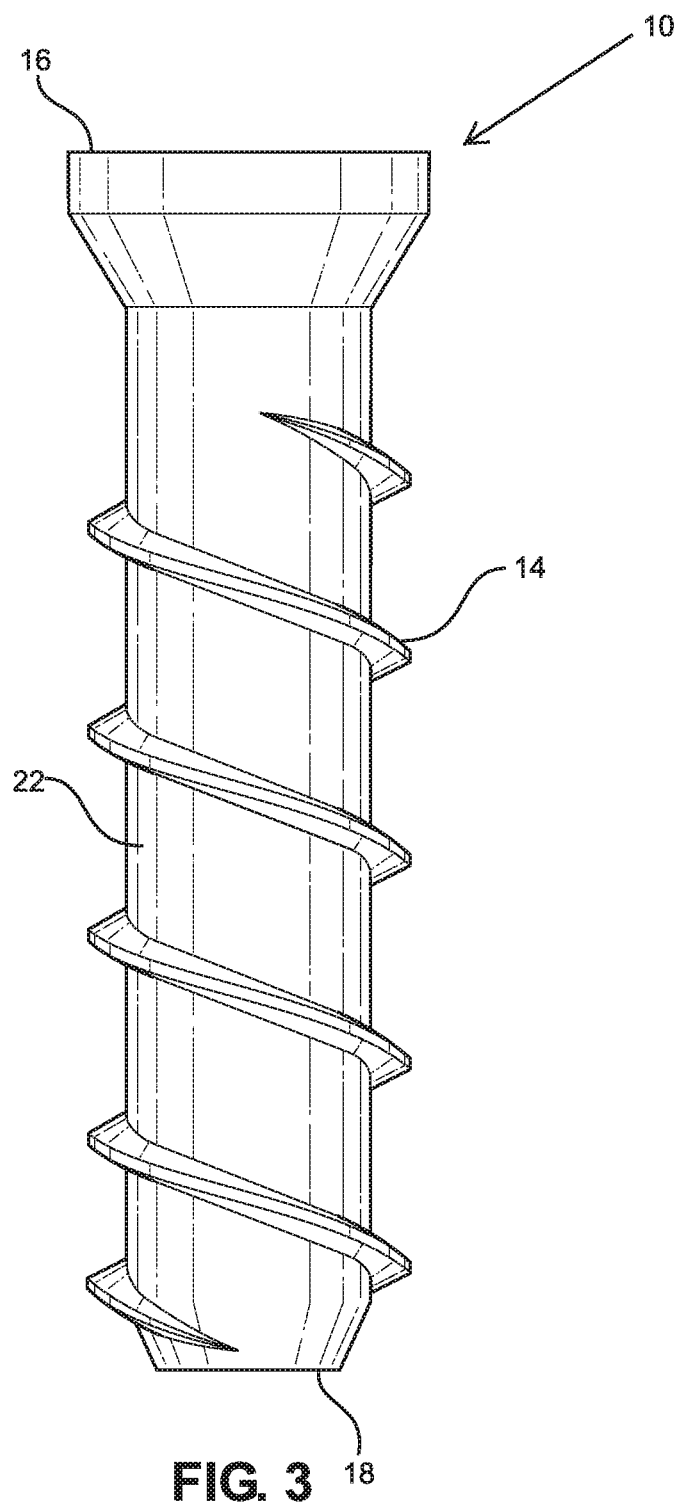
FIG. 3 is a side elevation view of an exemplary embodiment of the present invention.
Figure 4:
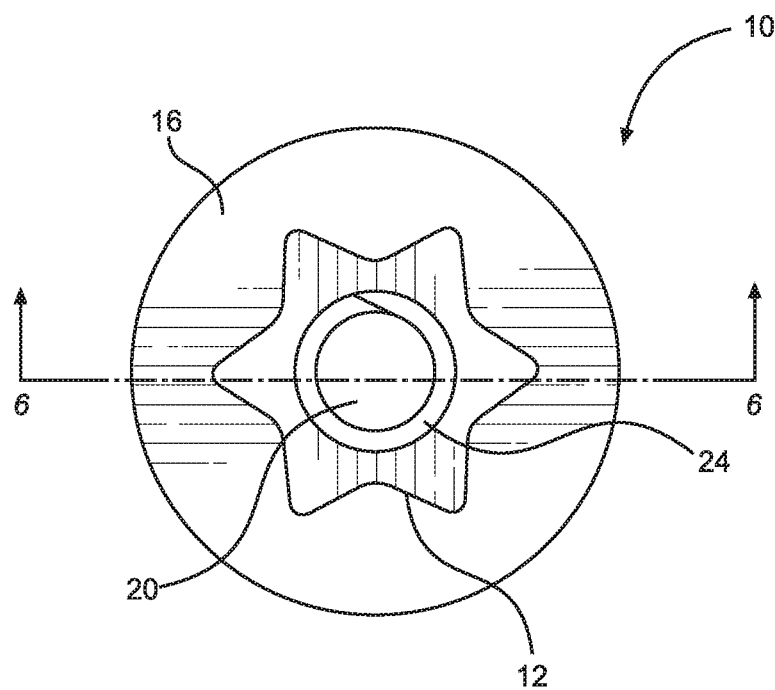
FIG. 4 is a top plan view of an exemplary embodiment of the present invention.
Figure 5:
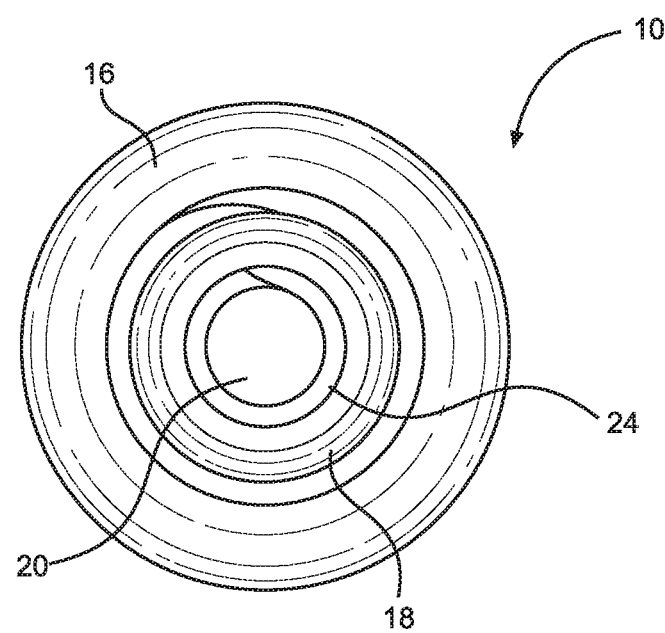
FIG. 5 is a bottom plan view of an exemplary embodiment of the present invention.
Figure 6:
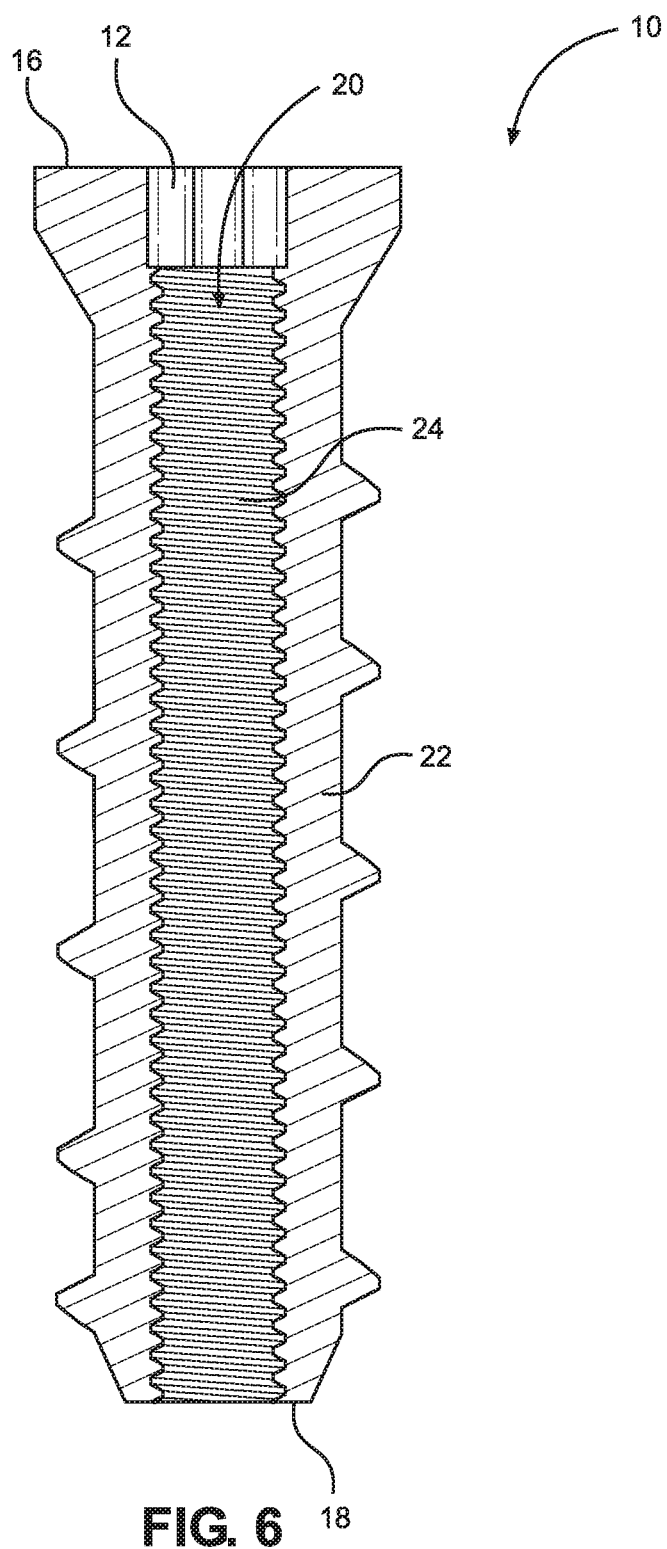
FIG. 6 is a cross-sectional view of an exemplary embodiment of the present invention, taken along line 6-6 in FIG. 4.
Figure 7:
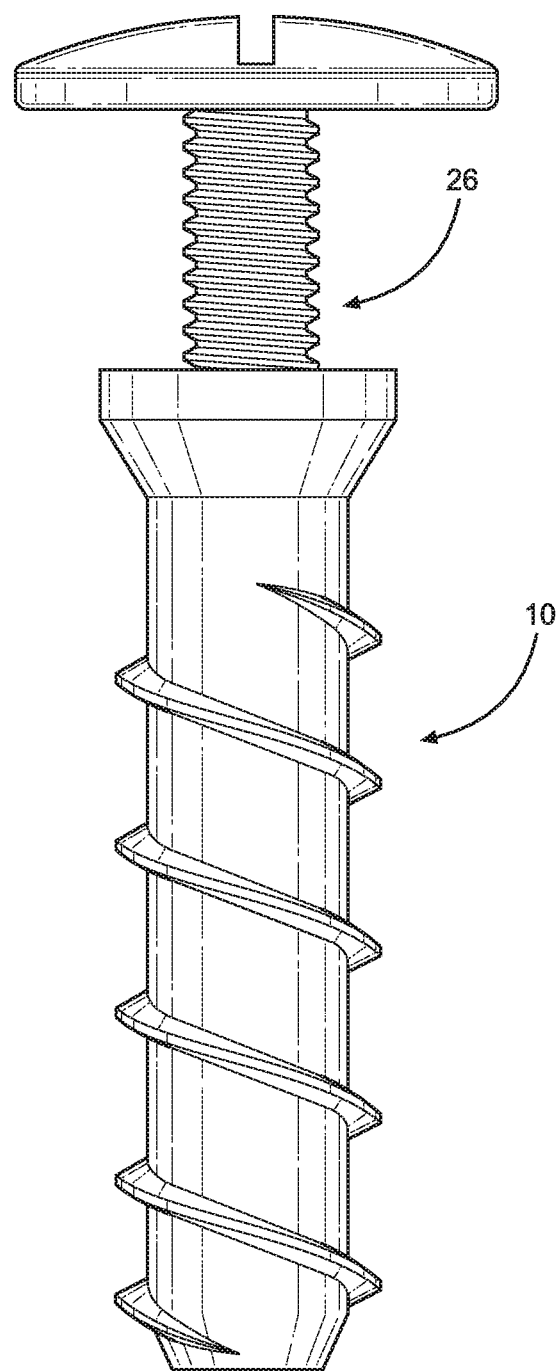
FIG. 7 is a side elevation view of an exemplary embodiment of the present invention, shown in use.

Referring now to FIGS. 1 through 7, the present invention may provide a reverse thread anchor 10 providing first-direction outer threading 14 along its body 22. The reverse thread anchor 10 may be made from carbon steel casting with an anti-corrosion coating. By threading, it is understood to be a helical structure used to convert between rotational and linear movement or force—for example, a ridge wrapped around a cylindrical body 22 in the form of a helix. Generally speaking, the helix of a thread can twist in two possible directions, which is known as handedness. Most threads are oriented so that the threaded item, when seen from a point of view on the axis through the center of the helix, moves away from the viewer when it is turned in a clockwise direction, and moves towards the viewer when it is turned counterclockwise. This is known as a right-handed (RH) thread, while threads oriented in the opposite direction are known as left-handed (LH). The outer threading 14 may be counterclockwise, single or double helix threading so that the reverse thread anchor 10 is screwed into a substrate counterclockwise (i.e., first direction is counterclockwise or left-handed oriented). As a corollary, the reverse thread anchor 10 would be removed from the substrate in an opposite second direction; here, unscrewed in the clockwise direction.

The reverse thread anchor 10 may extend from a head end 36 to a bottom end 18. An internal bore 20 may extend through the body 22 of the reverse thread anchor 10 from the head end 36 to the bottom end 18. The bore 20 may provide internal treading 24 having a second-direction, left-handed orientation for a fastener 26 to operatively associate with and screw into the bore 20 clockwise. The internal treading 24 may be internal ¼-20 SAE thread through the entire length of the reverse thread anchor 10. As a result, such a fastener 26 would operatively disengage with and unscrew from the bore in the first, counter-clockwise direction.

The head end 36 may provide a head 16 providing an hexalobular internal (female) receptacle 12, wherein such receptacle extends the depth of the head 16, approximately ¼" deep in certain embodiments. The hexalobular internal receptacle 12 may be dimensioned and adapted to operatively associate with a Torx™ (a Trademark owned by Textron) driver or equivalent male screwing instrument. The shape of the driver head receptacle 12 could be hexagonal, octagonal or square, as long as the shape of the receptacle 12 is adapted for sufficient application of torque to the anchor needed for the masonry applications disclosed herein, and so that the receptacle 12 opening is larger than the opening of the bore 20.

It being understood that in an alternative embodiment, the first direction of the outer threading 14 could be clockwise (right-handed threading), while the second direction of the internal treading 24 is counter-clockwise (left-handed threading).

A method of using the present invention may include the following. The reverse thread anchor 10 disclosed above may be provided. A user may, using standard power tools, drill a preparatory hole (in certain embodiments, ⁷⁄₁₆" by 2" deep) into the substrate prior to insertion of the reverse thread anchor 10. The reverse thread anchor 10 may then be driven in a counterclockwise (first) direction. The fastener 26 for securing, for example, a hurricane-protective device, is installed in a standard clockwise direction. When corrosion is present, as is often the case when inserted bolts are not frequently removed, the bolt can be removed by using greater force without threat of the reverse thread anchor 10 coming out. Although the reverse thread anchor 10 is targeted for hurricane-protection devices which may be infrequently installed, other applications of equipment that is infrequently removed and reinstalled is possible. For example, anchoring machinery or construction equipment that will stay in place for extended periods of time could use this fastener anchor system for easy future removal and replacement.

It should be understood, of course, that the foregoing relates to exemplary embodiments of the invention and that modifications may be made without departing from the spirit and scope of the invention as set forth in the following claims.

What is claimed is:

1. A fastener anchoring system, comprising:
   an anchor comprising:
   an anchor body extending from a head end to a bottom end;
   an external first-direction threading along an outer surface of the anchor body, the external first-direction threading spaced below the head end;
   a bore extending through the anchor body;
   the head end having a female receptacle; and
   the bore having an internal threading starting adjacent the female receptacle; and
   a fastener comprising:
   a fastener body having an external second-direction threading along an outer surface of the fastener body, wherein the first-direction is opposite the second direction, and wherein a first pitch of the external first-direction threading is more than triple a second pitch of the external second-direction threading, wherein the external second-direction threading operatively associate with the internal threading.

2. The fastener anchoring system of claim 1, further comprising:
   the head end having a head;
   the head having a diameter greater than a diameter of the anchor body, wherein a tapered portion connects the head and the anchor body;
   the bottom end terminates in a taper, wherein the external first-direction threading terminates along the taper; and
   the female receptacle at least circumscribes or is greater than an opening of the bore,
   wherein the female receptacle is dimensioned to operatively associate with a driver dimensioned to be operatively associated with the fastener.

3. The fastener anchoring system of claim 2, wherein the female receptacle is of a hexalobular internal type.

4. The fastener anchoring system of claim 1, wherein the first direction is associated with left-handed threading, and wherein the second-direction is associated with right-handed threading.

5. The fastener anchoring system of claim 1, wherein the first direction is associated with left-handed threading, and wherein the second-direction is associated with right-handed threading.

6. The fastener anchoring system of claim 1, wherein the first direction is associated with right-handed threading, and wherein the second-direction is associated with left-handed threading.

7. The fastener anchoring system of claim 1, wherein the first direction is associated with right-handed threading, and wherein the second-direction is associated with left-handed threading.

8. A method of installing anchor fasteners for hurricane-protective devices, comprising:
   providing the fastener anchoring system of claim 1;
   screwing the anchor body into a substrate in a counter-clockwise direction; and
   screwing the fastener into the bore in a clockwise direction, wherein the fastener secures a portion of a hurricane-protective device.

* * * * *